United States Patent [19]

Furukawa et al.

[11] 3,940,378

[45] Feb. 24, 1976

[54] METHOD FOR MANUFACTURING OF BUTADIENE-PROPYLENE COPOLYMERS

[75] Inventors: Junji Furukawa, Kyoto; Kazuo Haga, Kodaira; Eiichi Kobayashi, Uji, all of Japan

[73] Assignee: Bridgestone Tire Company Limited, Tokyo, Japan

[22] Filed: June 12, 1974

[21] Appl. No.: 478,730

Related U.S. Application Data

[63] Continuation-in-part of Ser. No. 143,242, May 13, 1971, abandoned.

[30] Foreign Application Priority Data

May 14, 1970 Japan................................ 45-40546

[52] U.S. Cl............................................ 260/85.3 R
[51] Int. Cl.$^2$... C08F 2/06; C08F 4/52; C08F 36/06
[58] Field of Search .............................. 260/85.3 R

[56] References Cited
UNITED STATES PATENTS 3,714,133  1/1973  Kawasaki et al. ............... 260/85.3 R
3,766,153  10/1973  Kawasaki et al. ............... 260/85.3 R
3,803,106  4/1974  Hayashi et al. ................. 260/85.3 R Primary Examiner—Alan Holler
Attorney, Agent, or Firm—Haseltine, Lake & Waters

[57] ABSTRACT

A method for manufacturing a high molecular weight, elastic and random type butadiene-propylene copolymer whose propylene content is in the range of 3 to 45 mol%, which comprises copolymerizing butadiene and propylene in the molar ratio ranging from 1/10 to 10/1 at a temperature in the range of 0° to 80°C in the presence of a catalyst system consisting of (1) at least one compound selected from the group consisting of titanium tetrachloride, titanium tetrabromide and vanadyl trichloride, (2) an organoaluminum compound having the general formula, $ALR^1R^2R^3$ wherein $R^1$, $R^2$ and $R^3$ represent a hydrocarbon radical and (3) phosgene, in which said components (2) and (3) are mixed at room temperature prior to the addition of other catalyst components and of monomers. The resulting random butadiene-propylene copolymer is highly elastic and superior to cis-1,4-polybutadiene in resistance to thermal aging.

8 Claims, 3 Drawing Figures

METHOD FOR MANUFACTURING OF BUTADIENE-PROPYLENE COPOLYMERS

CROSS - REFERENCE TO RELATED APPLICATION

This application is a Continuation-In-Part Application of Ser. No. 143 242 filed on May 13, 1971, now abandoned.

BACKGROUND OF THE INVENTION

1. Field of the Invention

The present invention relates to a method for manufacturing a butadiene-propylene copolymer. More precisely, it relates to a method for manufacturing a novel, elastic butadienepropylene random copolymer having a high molecular weight for use in the rubber industry.

The propylene unit in the polymer chain of the random copolymer obtained by the present invention is statistically distributed in proportion to its content (3 to 45 mol%) and butadiene units are bonded more than 60% in the form of cis-1,4 configuration.

2. Description of the Prior Art

In the rubber industry, the demand for rubber having high elasticity and excellent resistance to abrasion and thermal aging is increasing.

A butadiene propylene copolymer having random and statistical distribution of both monomer units is expected to be an excellent rubber to fulfill the demand as described above, whose properties could not be attained by conventional ethylene-propylene rubber or cis-1,4-polybutadiene.

The copolymerization of diolefin and α-olefin by Ziegler type catalysts has been attempted by several investigators.

Conventional Ziegler catalysts were found by Suminoe et al. to give a block copolymer of butadiene and propylene (T. Suminoe, N. Yamazaki and S. Kanbara; Kobunshi Kagaku, 20, 461, 1963).

Ishizuka et al. disclosed the method of preparing a butadiene propylene random copolymer by use of a catalyst prepared from titanium chloride or bromide and trialkylaluminum modified with a high molecular weight polyether having a polymerization degree of greater than 9 (U.S. Pat. No. 3 590 624).

However, the Examples of the disclosure have shown that a block copolymer or homopolymers of both monomers were partly produced in addition to a random copolymer by this method.

A highly alternating copolymer of butadiene with an α-olefin was prepared by Kawasaki et al. by use of a vanadium compound or titanium compound mixed with aluminum alkyl at an extremely low temperature to avoid the aggregation of the catalyst (U.S. Pat. Nos. 3 652 518, 3 652 519 and 3 714 133). In this alternating copolymer, the butadiene unit and the propylene unit are bonded alternately and the contents of both monomer units are about 50 mol% respectively.

That is quite different from the random copolymer of the present invention, whose propylene content is within the range of 3 to 45 mol%.

SUMMARY OF THE INVENTION

The object of a present invention is to provide the method for manufacturing a butadiene-propylene random copolymer whose propylene content is within the range of 3 to 45 mol% by use of a special catalyst.

The copolymer obtained by the present invention has high elasticity and excellent resistance to thermal aging.

In accordance with the present invention, we have found that butadiene-propylene random copolymers whose propylene content is within the range of 3 to 45 mol% are prepared by copolymerizing butadiene and propylene in the mol ratio ranging from one-tenth to ten at a temperature of 0° to 80°C by use of the catalyst consisting of (1) at least one compound selected from the group consisting of titanium and vanadium compounds, (2) an organoaluminum compound having the general formula, $AlR^1R^2R^3$ wherein $R^1$, $R^2$ and $R^3$ represent a hydrocarbon radical and (3) phosgene, in which said components (2) and (3) are mixed at room temperature prior to the addition of other components and of the monomers, the mol ratio of said component (1) to said component (2) being one to ten, the mol ratio of said component (2) to component (3) being ten to one, the amount of said component (1) being 0.05 to 15 mmol based on 100 gr of the total amount of the monomers charged.

The copolymerization of the present invention must be carried out under restricted conditions.

One of the essential factors of the method of the present invention is the catalyst preparation method whereby the catalyst component (2) and component (3) are mixed prior to the addition of the other catalyst components and of the monomers and are kept for several minutes at room temperature for catalyst aging.

Only by this method, can a butadiene-propylene random copolymer having a high molecular weight and high activity be obtained.

Phosgene as catalyst component (3) of the present invention plays an important role.

The oxygenated organic halides other than phosgene such as benzoyl chloride, chloromethyl methyl ether, α-chloroacetophenone, chloroacetate etc., whose chemical properties are similar to phosgene did not show good results in combination with catalyst components (1) and (2), which are shown later in the Comparative Example.

Conventional Ziegler catalysts without phosgene only give a block copolymer or the mixture of homopolymers.

Kawasaki et al. have disclosed in their Patent (U.S. Pat. No. 3 714 133) the catalyst for butadiene-propylene alternating copolymerization prepared in such a manner that titanium tetrachloride and a vanadyl compound are mixed for several minutes at room temperature, the mixture is cooled down to −78°C, then trialkylaluminum is added to said cooled mixture at −78°C. The resulting copolymer is different from the random copolymer of the present invention because of the catalyst preparation method and the polymerization temperature.

The another essential factor of the present invention is the polymerization temperature. The copolymerization of the present invention is carried out within the range of 0° to 80°C. Polymerization at a low temperature lower than 0°C has shown extremely low activity. Polymerization at higher than 80°C has been apt to cause gelation.

DETAILED DESCRIPTION OF THE PREPARED EMBODIMENTS

Figure 1:
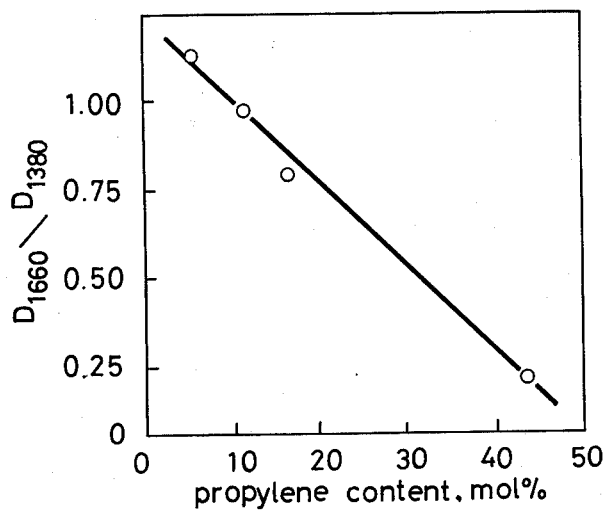
FIG. 1 shows the linear relation between polypropylene content in the polymer mixture of polybutadiene and polypropylene, and $D_{1660}/D_{1380}$.

The component (1) to be used for the catalyst system of the present invention is a titanium or vanadium compound such as titanium tetrachloride, titanium tetrabromide, titanium tetraiodide, vanadyl trichloride, vanadium tetrachloride, vanadium acetylacetonate, vanadyl acetylacetonate, vanadyl isobutylate, vanadyl monochloro-isobutylate and vanadyl dichloroisobutylate.

Among them, titanium tetrachloride, titanium tetrabromide, titanium tetraiodide and vanadyl trichloride are preferred.

The component (2) to be used for the catalyst system of the present invention is an organoaluminum compound having the general formula, $AlR^1R^2R^3$ wherein $R^1$, $R^2$ and $R^3$ represent a hydrocarbon radical having 1 to 18 carbon atoms each of which may be the same or different.

Among them, organoaluminum compounds having the general formula, $AlR^1R^2R^3$ wherein $R^1$, $R^2$ and $R^3$ represent an alkyl radical having 1 to 4 carbon atoms are preferred.

As said catalytic component (2), mention may be made of trimethyl aluminum, triethyl aluminum, tri-n-propyl aluminum, triisopropyl aluminum, tri-n-butyl aluminum, triisobutyl aluminum, tri-t-butyl aluminum, triphenyl aluminum and diethyl isobutyl aluminum.

Among them, triethyl aluminum, triisopropyl aluminum and triisobutyl aluminum are preferred.

The component (3) is phosgene as referred to above. Phosgene may be used in hydrocarbon solution or in the gaseous state.

The amount of the catalyst used in the present invention is not limited but it is preferable to use said component (1) in the amount of 0.05 to 15 mmol and more preferably 0.5 to 5 mmol to 100 gr monomers of both monomers. The molar ratio of the catalyst component (1) to the catalyst (2) is within the range of one to one-tenth, preferably 1/1.2 to 1/6.

Polymerization activity decreases markedly when the molar ratio of the component (1) to the component (2) is more than one, which is shown later in a comparative Example.

The molar ratio of the catalyst component (2) to the catalyst (3) is within the range of ten to one, preferably six to two.

When preparing the catalyst of the present invention, it is necessary to mix the components (2) and (3) prior to the addition of other catalyst components and of the monomers.

The copolymerization is usually carried out in the presence of an inert solvent which does not inhibit the copolymerization reaction.

As such solvent, mention may be made of aliphatic hydrocarbons, alicyclic hydrocarbons, aromatic hydrocarbons and halogenated hydrocarbons, for example propane, butane, pentane, hexane, heptane, octane, ligroin, petroleum ether, cyclopentane, cyclohexane, cyclooctane, benzene, toluene, xylene, dichloromethane, dichloroethane, trichloroethane, tetrachloroethane, tetrachloroethylene, butyl chlorite, chloroform, chlorobenzene, dichlorobenzene, carbon tetrachloride and mixture thereof.

Polymerization is carried out at a temperature ranging from from 0° to 80°C, preferably 20° to 50° and under a pressure from that determined by the vapor pressure in the reaction system to 100 atms. At the completion of the copolymerization reaction, the product is precipitated and deashed by use of a methanolhydrochloric acid mixture. The precipitated product is washed with methanol several times and dried under vacuum. The characterization of the resulting copolymer was conducted as follows.

The copolymer composition was estimated by the infrared method with the copolymer films from the value of the ratio $D_{1660}(\nu_{C=C})/D_{1380}(\delta_S CH_3)$. The films were prepared on a potassium bromide plate by evaporating the polymer solution. The calibration curve for the copolymer composition was obtained from that of homopolymer mixtures. As shown in FIG. 1, the calibration curve seems to be valid for the analysis of copolymers containing less than 40% propylene units.

The gel content in the copolymers was estimated from the toluene-insoluble part. The intrinsic viscosity number was determined in toluene solution at 30° ± 0.05°C with an Ubbelohde type viscometer. The fractionation of the copolymers was done by adding methanol and methyl ethyl ketone to the benzene solution of the copolymers. The degradation of the copolymers by oxidation suggested that the copolymers did not contain long sequences of propylene units. The degradation was carried out as follows. A copolymer solution composed of 1 gr of copolymer and 100 gr of o-dichlorobenzene, 2 ml of $OsO_4$ solution (0.2 gr/l in toluene) and 20 ml of t-Bu hydroperoxide were mixed and allowed to react at 100°C for 0.5 hr. After the reaction, the mixture was poured into a large amount of methanol, but no precipitate was detected.

The invention shall be explained in more detail in reference to the following Examples which shall be given not for limiting the invention thereto but merely for the purpose of explanation.

EXAMPLE 1

A 100 ml pressure bottle was dried and purged with nitrogen gas. Then, 15 ml of tetrachloroethylene, 1.2 mmol of triethyl aluminum and 0.25 mmol of phosgene as 0.25 mol/l toluene solution thereof were added to the bottle under nitrogen atmosphere at room temperature. The resulting mixture was allowed to stand for 10 minutes.

Thereafter, the bottle was cooled down to −78°C by means of methanol-dry ice bath and 7.2 gr of butadiene, 6.3 gr of propylene and 0.35 mmol of titanium tetrachloride were added thereto. The bottle was sealed and subjected to copolymerization under shaking at 40°C for 2.5 hrs.

The reaction system was poured into a large amount of methanol containing a small amount of 2,6-di-tert-butyl p-cresol as antioxidant, whereby the copolymerization reaction was stopped and the resulting copolymer was precipitated. The precipitate was purified and dried to obtain 5.4 gr of rubbery solid.

The product was subjected to analysis by means of Infrared Spectrometric technique. The propylene content of the copolymer was 16.7 mol% and the microstructure of butadiene units was 65% of the cis-1,4 structure, 31% of trans-1,4 structure and 4% of 1,2 structure.

The copolymer obtained was further subjected to analysis to determine the sequence of propylene units by means of the oxidative decomposition method. However, no methanol insoluble portion was obtained. This fact showed that the distribution of propylene units in the copolymer obtained by this example was a random one.

The fractionation results of the copolymer obtained by the method of Suminoe et al. also showed that the product obtained by this example was a random one. The transparency of the film prepared with the copolymer was very good.

EXAMPLE 2 and Reference Examples 1 to 6

Into a 100 ml pressure bottle, 15 ml of tetrachloroethylene and 1.2 mmol of triethylaluminum together with or without one of the oxygenated organic halides as indicated in Table 1 (as 0.25 mol/l solution of toluene thereof) were added and allowed to stand at room temperature for 10 minutes. The bottle was cooled down to −78°C, then 7.2 gr of butadiene, 6.3 gr of propylene and 0.3 mmol of titanium tetrachloride were successively added thereto.

After sealing the bottle, the polymerization was carried out at 40°C for 2.5 hrs in each case.

After the completion of the polymerization, the resulting product was poured into methanol having a small amount of hydrochloric acid and 2,6-di-tert-butyl p-cresol as the antioxidant. The results obtained are shown in the following Table 1.

Table 1

| Run No. | | Oxygenated organic halide | (mmol) | Yield (%) | Appearance |
|---|---|---|---|---|---|
| Reference Example | 1 | — | — | trace | wax-like |
| " | 2 | Benzoyl chloride | 0.3 | trace | wax-like |
| " | 3 | " | 0.6 | 5.0 | rubber-like |
| " | 4 | Chloromethyl ethylether | 0.6 | trace | wax-like |
| " | 5 | α-chloro-acetophenone | 0.6 | trace | wax-like |
| Example | 2 | Phosgene | 0.6 | 35.3 | rubber-like |

According to the results of Table 1, it was proved that the highly active rubber-like copolymer was prepared only by use of phosgene which was one of the oxygenated organic halides in this experiment. The resulting copolymer of Example 2 had no gel at all and the IR absorption spectrum analysis shows as follows: propylene content 19.0 mol%; cis-1,4 content 65%; trans-1,4 content 33%; 1,2- content 2%. Furthermore, after the oxidation of the resulting copolymer (Example 2) by $OsO_4$ and t-butylhydroperoxide, no residue was observed and no serially lined propylene unit was determined in said oxidized copolymer.

Accordingly, the copolymer obtained by Example 2 was recognized as the random copolymer of butadiene and propylene.

On the contrary, in the Reference Examples lower polymerization activity was obtained in each case. The rubber-like appearance was observed for the copolymer obtained by Reference Example 3 but the gel content thereof was still about 35%. After the oxidation of the resulting copolymer of Reference Example 3 by $OsO_4$ and t-butyl hydroperoxide, about 14% of the homopolymer of propylene was determined.

EXAMPLES 3 to 6

The copolymerizations were carried out in a manner similar to Example 1 except that the molar ratios of butadiene to propylene were varied as shown in Table 2.

Table 2

| Run No. | | Butadiene/propylene (mol ratio) | Copolymerization time(min) | Yield | Propylene content(mol%) |
|---|---|---|---|---|---|
| Example | 3 | 8/2 | 12 | 6.2 | 4.6 |
| " | 4 | 6/4 | 15 | 7.8 | 6.2 |
| " | 5 | 4/6 | 18 | 8.2 | 14.6 |
| " | 6 | 2/8 | 20(hrs) | 30.0 | 43.2 |

Figure 2:
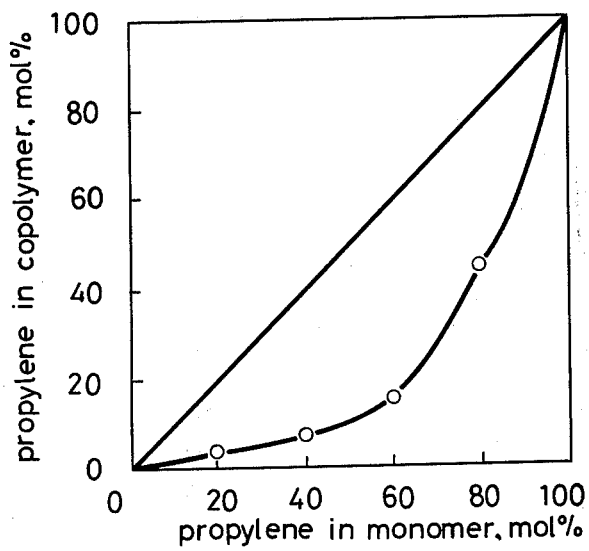
FIG. 2 shows the copolymerization composition curve in the copolymerization of butadiene and propylene according to the results obtained in Examples 3 to 6.

Copolymerization composition curve is shown in FIG. 2.

The monomer reactivity ratio of each monomer ($r_{BD}$ and $r_{Pr}$) calculated from the above results of Table 2 are 6.36 and 0.42 respectively.

From these results, it was obvious that the copolymers prepared by the method of the present invention were random ones.

EXAMPLE 7

The copolymerization was carried out in a manner similar to Example 1 except that the catalyst prepared from 1.2 mmol of triethylaluminum, 1.2 mmol of phosgene (as 0.25 mmol/l toluene solution thereof) and 0.35 mmol of titanium tetrachloride was used. 4.6 gr of rubbery product was obtained. The intrinsic viscosity of the product was 1.94 and the propylene content of the polymer was 22 mol% and there was no gel in the product.

The sequence distribution of each monomer unit of the resulting copolymer was determined by the fractional precipitation technique. The fractionation of the copolymer was carried out according to the method of Suminoe et al. (T. Suminoe, N. Yamasaki and S. Kanbara; Kobunshi Kagaku, 20, 461, 1963).

The copolymer was dissolved in benzene so as to attain the concentration of 0.164 gr/12 ml therein.

Figure 3:
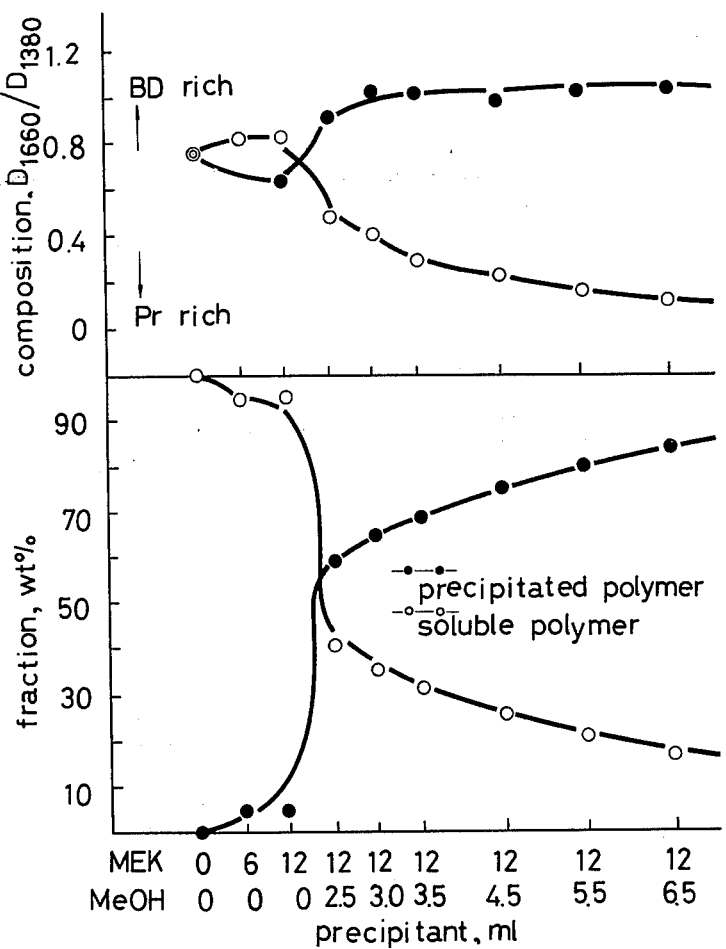
FIG. 3 shows the results of fractional precipitation of butadiene-propylene copolymer with methanol and methyl ethyl ketone in Example 7.

The result of the fractionation is shown in FIG. 3. In FIG. 3, it is clear that the composition of each fraction was slightly changed but the precipitate of each fraction was remarkably changed as the amount of the addition of precipitant was increased. According to the above fact, the sequence distribution of the copolymer was estimated as random.

The transparency of the copolymer film was also very good.

The amount of insoluble material after the oxidation of the copolymer is negligible. According to these results it was clear that the arrangement of the monomer units in the copolymer chain obtained by this Example was random.

EXAMPLES 8 to 10 and Reference Example 7

The copolymerization was carried out in a manner similar to Example 1 except that the molar ratios of catalyst component (2) (AlEt$_3$) to catalyst component (1) (TiCl$_4$) were varied as shown in Table 3. The results obtained are shown in Table 3.

The products obtained by Examples 8 to 10 were elastic random copolymers having no gel. However, it is clear from Table 3 that the random copolymer having a high molecular weight was not obtained by use of the catalyst consisting of organoaluminum and titanium tetrachloride having the molar ratio therebetween Table 3

| Run No. | AlEt$_3$ (mmol) | Al/Ti (mol ratio) | Al/COCl$_2$ (mol ratio) |
|---|---|---|---|
| Example 8 | 0.8 | 2.29 | 3.8 |
| Example 9 | 1.2 | 3.43 | 3.8 |
| Example 10 | 2.0 | 5.70 | 3.8 |
| Reference Example 7 | 1.1 | 0.92 | 3.8 |

| Run No. | Polymerization time (hr) | Yield (%) | [η] | Gel (%) | Propylene content(mol%) |
|---|---|---|---|---|---|
| Example 8 | 6.3 | 1.7 | 1.49 | 0 | 35 |
| Example 9 | 3 | 3.4 | 1.85 | 0 | 16 |
| Example 10 | 3 | 4.6 | 1.32 | 0 | 17 |
| Reference Example 7 | 2.5 | trace | wax-like | 0 | — | of less than 1/1 (Reference Example 7).

Reference Example 8

The copolymerization was carried out in a manner similar to Example 9 except that phosgene was not used as reactant. The resulting polymer was deemed to be a mixture of butadiene and propylene and the gel content thereof was 70%. The residue after oxidative degradation was about 45%.

EXAMPLES 11 to 14

The copolymerization was carried out in a manner similar to Example 2 except that the solvents shown in Table 4 were used instead of tetrachloroethylene.
The results obtained were shown in Table 4.

Table 4

| Run No. | Solvent | Polymerization time (hr) | Yield (%) | [η] | Propylene content(mol%) |
|---|---|---|---|---|---|
| Example 11 | Toluene | 2.0 | 4.8 | 1.04 | 8 |
| " 12 | Hexane | 23.5 | 6.0 | 1.04 | 37 |
| " 13 | Monochlorobenzene | 2.75 | 5.8 | 0.96 | 32 |
| " 14 | Methylene dichloride | 2.75 | 4.0 | 1.13 | 31 |

EXAMPLE 15

The copolymerization was carried out in a manner similar to Example 2 except that triisobutyl aluminum was used as the catalyst component (2) instead of triethyl aluminum.

The resulting product was an elastic rubber-like solid having no gel. The yield of the product was 21.0% and the intrinsic viscosity thereof was 1.51. The propylene content determined by IR analysis was 33%.

EXAMPLES 16 to 17

The copolymerization was carried out in a manner similar to Example 2 except that vanadyl trichloride or titanium tetrabromide as catalyst component (1) was used instead of titanium tetrachloride.
The results obtained are shown in Table 5.

Table 5

| Run No. | Component (1) | Polymerization time (hr) | Yield (%) | Appearance |
|---|---|---|---|---|
| Example 16 | VOCl$_3$ | 6 | 2.4 | rubbery solid |
| " | TiBr$_4$ | 7 | 2.2 | rubbery solid |

EXAMPLE 18 and Reference Examples 9 to 11

The copolymerizations were carried out by use of the catalysts prepared by various methods using TiCl$_4$, AlEt$_3$ and phosgene as shown in Table 6. Extremely low polymerization activity was obtained at a low polymerization temperature (Reference Example 18) by use of the catalyst prepared in a manner similar to Example 1.

Table 6

| Run No. | Catalyst preparation method | Yield (%) | [η] | Propylene content (mol%) | Butadiene unit (%) | | |
|---|---|---|---|---|---|---|---|
| | | | | | cis | trans | 1,2 |
| Example | (A) | 5.2 | 1.70 | 18.0 | 64 | 30 | 6 |
| Reference Example 9 | (B) | 0.1 | 0.5 | 25.0 | 60 | 35 | 5 |
| Example 10 | (C) | 0.1 | 0.3 | 48 | 85 | 10 | 5 |
| Example 11 | (D) | 2.5 | not determ- | — | — | — | — |

Table 6-continued

| Run No. | Catalyst preparation method | Yield (%) [7] | | Propylene content (mol%) | Butadiene unit (%) | | |
|---|---|---|---|---|---|---|---|
| | | | | | cis | trans | 1,2 |
| | | | ined *2 | | | | |
| (A) AlEt₃-COCl₂ | rt *1 → | Monomer TiCl₄ | 40°C → | Polymerization | | | |
| (B) AlEt₃-COCl₂ | rt → | Monomer TiCl₄ | −30°C → | Polymerization | | | |
| (C) TiCl₄-COCl₂ | rt −78°C →→ | AlEt₃ Monomer | −30°C → | Polymerization | | | |
| (D) AlEt₃-TiCl₄-COCl₂ | rt → | Monomer | rt → | Polymerization | | | |

*1: room temperature (20°C)
*2: gel content was 50 wt%
*3 polymerization time was 2.5 hrs The copolymerization activity obtained at a very low temperature by use of the catalyst prepared at −78°C by mixing triethylaluminum and the reactant of titanium tetrachloride with phosgene was also extremely low. The resulting copolymer seemed to be an alternating copolymer.

A block copolymer having a high gel content was obtained in the copolymerization carried out by use of the catalyst prepared by mixing phosgene and the reactant triethylaluminum with titanium tetrachloride at room temperature (Reference Example 11).

It was shown from these results that only the restricted copolymerization method of the present invention gave the desired random copolymer with high polymerization activity.

EXAMPLE 19

Into a 1000 cc capacity autoclave made of pressure glass having been sufficiently dried in vacuo, and filled with dried nitrogen gas, were added 150 ml tetrachloroethylene, 12 ml of a hexane solution of triethyl aluminum in the concentration of 1 mol/l and 5 ml of a toluene solution of phosgene, in the concentration of 0.5 mol/l to be cooled down to −78°C. Then 73 gr butadiene and 68 gr propylene were added thereto. 7 ml of a hexane solution of titanium tetrachloride in the concentration of 0.5 mol/l was added to raise the temperature gradually up to 40°C, so as to proceed with the copolymerization for 2 hours while maintaining said temperature. After the completion of the copolymerization, the contents were poured into a large amount of methanol containing a small amount of hydrochloric acid and antioxidant. The educed copolymer was dried in vacuo to constant weight. The white rubberlike copolymer was obtained in a yield of 51.3 gr and 36.4%. The intrinsic viscosity as determined at 30°C in toluene solution was 1.82 and the gel content insoluble in the solvent was 5%. The propylene content was 13 mol% according to nuclear magnetic spectrum. The microstructure of the 1,3-butadiene units was 68.7 % cis-1,4; 27.5% trans-1,4; and 3.8% -1,2. As a result of having subjected 1 gr of copolymer to the oxidation at 90°C in t-butyl hydroperoxide using osmium tetraoxide in p-dichlorobenzene as catalyst, and pouring into a large amount of methanol, there was observed almost no precipitate. This means that there was no long sequence of propylene units in the copolymer.

The copolymer was vulcanized to test the physical properties as an elastomer in comparison with cis-1,4-polybutadiene. The formulation therefor is shown in the following Table 7 and the physical properties of said rubbers vulcanized at 155°C for 15 minutes and aged in the following Table 8.

Table 7

| | | |
|---|---|---|
| Copolymer of invention (Intrinsic visc. 1.82) or Cis-1,4-polybutadiene (Intrinsic visc. 2.70) | 100 | weight part |
| | 1 | " |
| Stearic acid | | |
| Zinc white | 5 | " |
| Phenyl-B-naphthyl amine | 1 | " |
| Carbon black (ISAF) | 50 | " |
| Sulfur | 2 | " |
| Vulcanization accelerator (MSA) | 1.5 | " |

Table 8

| Properties | Vulcanized copolymer of invention | Control |
|---|---|---|
| Strength (kgr/cm²) | 117 | 182 |
| Elongation (%) | 370 | 370 |
| 100% modulus (kgr/cm²) | 26 | 40 |
| 300% modulus (kgr/cm²) | 98 | 182 |
| Hardness | 63 | 65 |
| Tear strength (kgr/cm²) | 47 | 26 |
| Properties after aging at 100°C for 24 hours | | |
| Strength (kgr/cm²) | 120 | 109 |
| (Change %) | (+2.5) | (−40.1) |
| Elongation (%) | 200 | 150 |
| (Change %) | (−50) | (−59.4) |
| 100% modulus (kgr/cm²) | 55 | 66 |
| (Change %) | (+111.5) | (+65.0) |
| Hardness | 63 | 65 |
| (Change %) | (±0) | (±0) |
| Properties after aging at 150°C for 24 hours | | |
| Strength (kgr/cm²) | 42 | 17 |
| (Change %) | (−64.1) | (−90.6) |
| Elongation (%) | 40 | 20 |
| (Change %) | (−89.1) | (−94.5) |
| Hardness | 78 | 73 |
| (Change %) | (+15) | (+6) |

It will be appreciated from the above that the copolymer of the invention was found to be superior to cis-1,4-polybutadiene in resistance to thermal aging.

What is claimed is:

1. A method for manufacturing a high molecular weight elastomeric butadiene-propylene random copolymer whose propylene unit content is in the range of 3 to 45 mol% and wherein no propylene unit chain exists in the resulting copolymer chain, which comprises copolymerizing, in an inert solvent, butadiene and propylene in the mol ratio ranging from one to ten at a temperature ranging from 0°C to 80°C, in the presence of a catalyst system consisting of (1) at least one compound selected from the group consisting of titanium tetrachloride, titanium tetrabromide, titanium tetraiodide and vanadyl trichloride, (2) an organoaluminum compound having the formula, $AlR^1R^2R^3$ wherein $R^1$, $R^2$ and $R^3$ represent a hydrocarbon radical having 1 to 18 carbon atoms each of which may be the same or different, and (3) phosgene, in which said components (2) and (3) are mixed at room temperature prior to the addition of other catalysts and of monomers, the mol ratio of said component (1) to said component (2) being one to ten, the mol ratio of said component (2) to said component (3) being ten to one, said component (1) being used in the amount of 0.05 to 15 mmol based on 100 gr of the total amount of the monomers as charged.

2. A method as claimed in claim 1, wherein said component (2) is a compound of said formula in which $R^1$, $R^2$ and $R^3$ represent an alkyl radical having 1 to 4 carbon atoms.

3. A method as claimed in claim 2, wherein said component (2) is selected from the group consisting of triethyl aluminum, tripropyl aluminum and triisobutyl aluminum.

4. A method as claimed in claim 1, wherein the mol ratio of said component (2) to said component (3) is six to two.

5. A method as claimed in claim 1, wherein said component (1) is used in the amount of 0.5 to 5 mmol based on 100 gr of the total amount of the monomers as charged.

6. A method as claimed in claim 1, wherein the inert solvent is a solvent selected from the group consisting of aliphatic hydrocarbons, alicyclic hydrocarbons, aromatic hydrocarbons and halogenated hydrocarbons.

7. A method as claimed in claim 6, wherein said solvent is tetrachloroethylene.

8. A method as claimed in claim 1 wherein the copolymerization temperature is 20° to 50°C.

* * * * *